July 15, 1969
D. SPAR ETAL
3,455,422
DRIVE FOR THE OIL PUMP OF AN AUTOMATIC
TRANSMISSION COUPLED TO AN ENGINE BY
A FRICTION CLUTCH
Filed Sept. 22, 1967
4 Sheets-Sheet 2
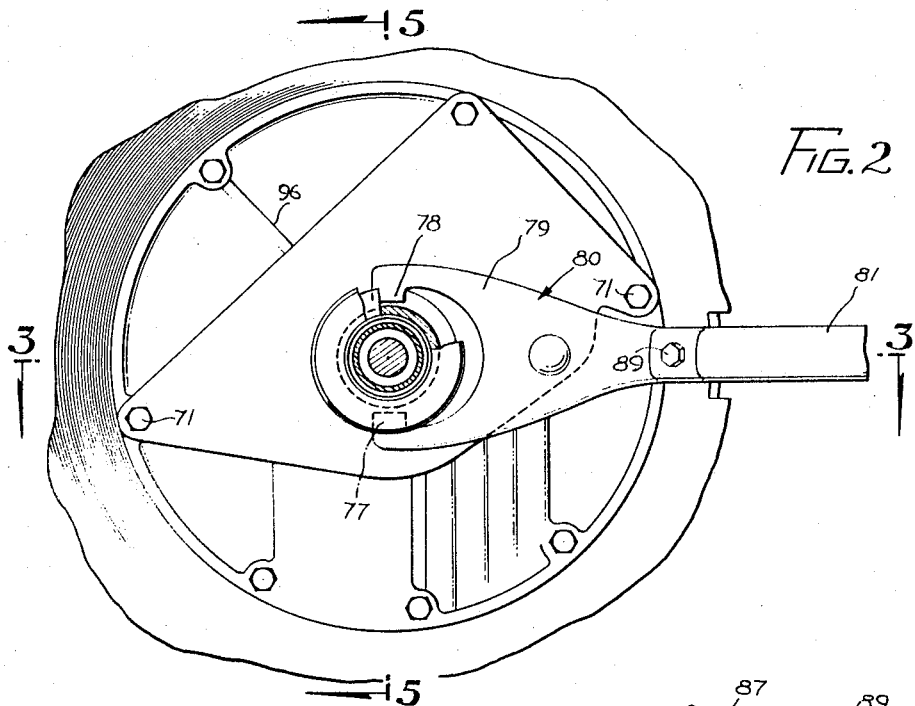
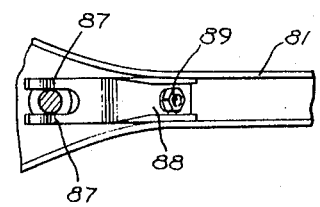
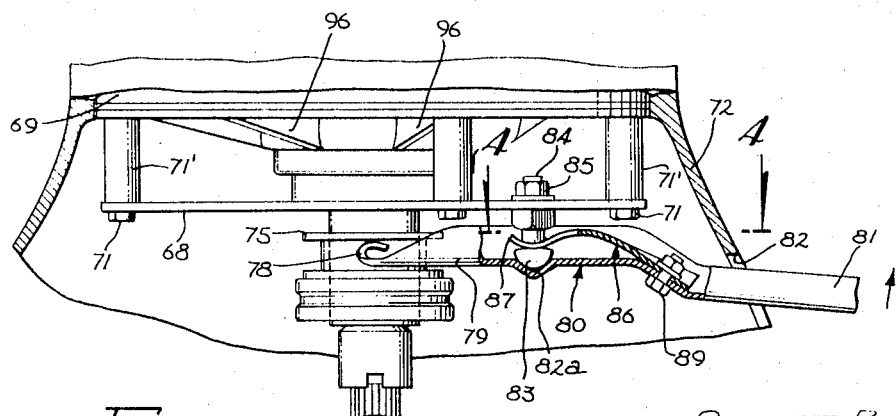
ROBERT B. SPAR
DONALD SPAR
INVENTOR.
BY *R.E. Geaugue*
ATTORNEY

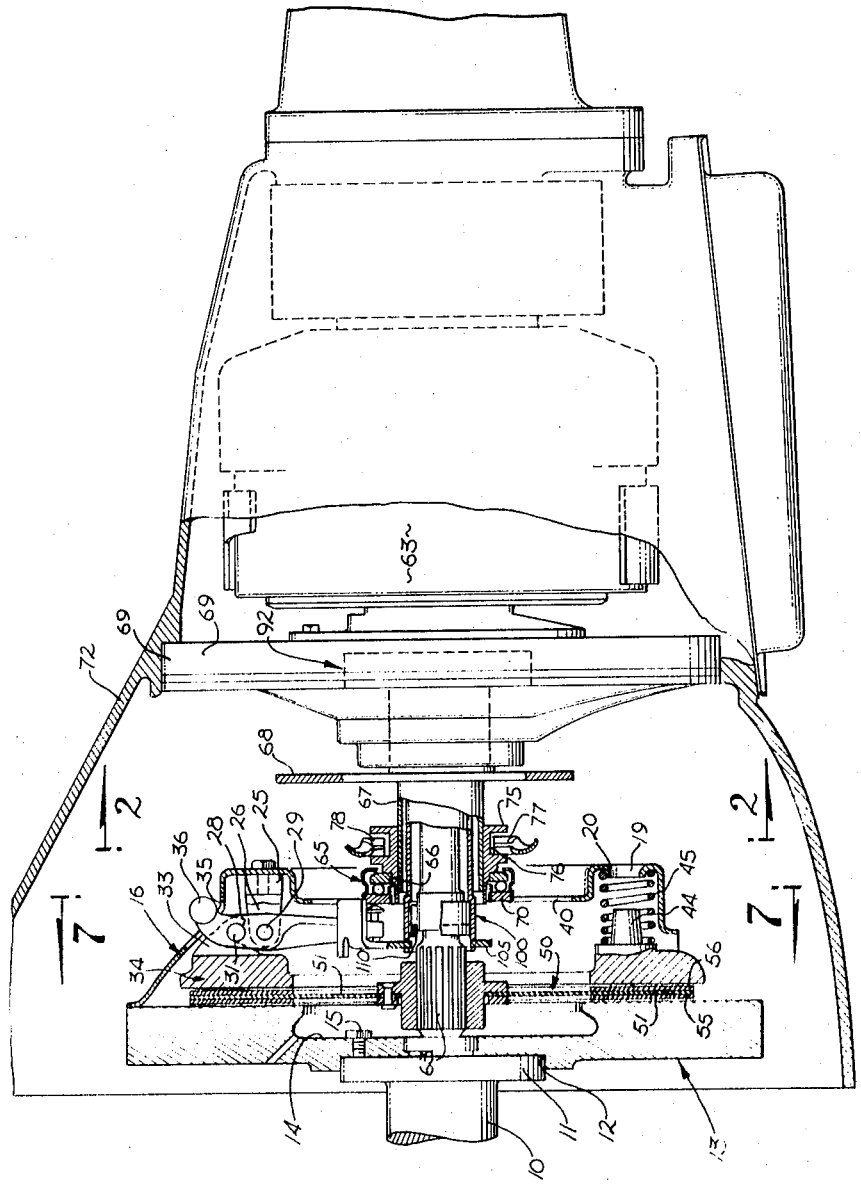

ROBERT B. SPAR
DONALD SPAR
INVENTOR.

BY R. E. Geangue
ATTORNEY

July 15, 1969

D. SPAR ETAL 3,455,422

DRIVE FOR THE OIL PUMP OF AN AUTOMATIC
TRANSMISSION COUPLED TO AN ENGINE BY
A FRICTION CLUTCH

Filed Sept. 22, 1967

ROBERT B. SPAR
DONALD SPAR
INVENTOR.

BY R. E. Geanger

ATTORNEY

United States Patent Office 3,455,422
Patented July 15, 1969

3,455,422
DRIVE FOR THE OIL PUMP OF AN AUTOMATIC TRANSMISSION COUPLED TO AN ENGINE BY A FRICTION CLUTCH
Donald Spar and Robert B. Spar, Granada Hills, Calif., assignors to B & M Automotive, Inc., Van Nuys, Calif., a corporation of California
Filed Sept. 22, 1967, Ser. No. 669,750
Int. Cl. F16d 23/10, 43/24; F04b 9/00
U.S. Cl. 192—105
7 Claims

ABSTRACT OF THE DISCLOSURE

A drive for an oil pump of an automatic transmission which is coupled to an engine with a friction clutch. The drive comprises a sleeve, on one end of which are spaced driving elements which slidably engage the actuating arms of the clutch, which are continually rotated with the clutch cover plate. The other end of the sleeve is enlarged to connect with the rotor of a standard transmission oil pump so that the sleeve continually drives the oil pump. A transmission shaft is selectively connected with the engine crankshaft by the friction clutch.

---

This invention relates to a drive for the oil pump of an automatic transmission coupled with a friction clutch and more particularly to a drive for the oil pump of an automatic transmission coupled with a friction clutch which replaces the torque converter of a conventional automatic transmission.

Present automatic transmissions, such as the Chrysler Tork-Flite transmission, are driven by a torque converter which is connected to the crankshaft of the engine. A pump is associated with the transmission for producing the fluid pressure required to shift the transmission and to lubricate the transmission and this pump should operate at all times while the engine is running. In drag racing, it is desirable to have the transmission in gear while the vehicle is sitting on the starting line with the engine running at high speed. However, if the automatic transmission is driven by a standard torque converter, the transmission cannot be in gear at the line with high r.p.m. since the power developed on the wheels would make it difficult to hold the vehicle by the brakes.

Therefore, the standard torque converter has been replaced by a friction clutch which can disengage the engine crankshaft from the transmission at high engine speed and the clutch can then be engaged to produce immediate high torque on the wheels through the transmission which is in gear. Since the pump for the automatic transmission is normally driven by the flex plate of the torque converter which is directly driven by the engine crankshaft, the replacement of the torque converter with a friction clutch could be accomplished if a separate pump for the transmission could be attached to the engine at a location remote from the transmission. However, with the present invention, the standard transmission pump is continually driven by the engine regardless of whether or not the friction clutch is engaged to drive the vehicle wheels through the transmission.

In one embodiment of the invention, the friction clutch has a clutch cover plate which is directly connected to the fly wheel of the engine and the plate movably supports the pressure plate of the clutch. The arms for releasing the pressure plate are carried by the clutch plate and these arms continually drive an auxiliary drive sleeve for the transmission pump, regardless of their position. Therefore, whether or not the clutch is engaged or released, there is a continual drive of the automatic transmission pump from the engine crankshaft through the cover plate.

It is an object of the present invention to provide a drive for the oil pump of an automatic transmission coupled to a friction clutch; said drive continually operating the pump for the automatic transmission whether or not the clutch is engaged.

Another object of the invention is to provide a drive for the oil pump of an automatic transmission in which the clutch cover plate is directly connected to the engine, and means are connected to the cover plate for directly driving the pump of the transmission.

Another object of the invention is to provided a drive for the oil pump of an automatic transmission driven by a friction clutch in place of a torque converter; the friction clutch being engageable to drive the transmission while the transmission is in gear.

These and other objects of the invention not specifically set forth above will become readily apparent from the accompanying description and drawings in which:

FIGURE 1 is an elevational view, partly in section, illustrating the friction clutch interposed between the engine drive shaft and the automatic transmission with the clutch released;

FIGURE 2 is a vertical section along line 2—2 of FIGURE 1 illustrating the actuating lever for the clutch;

FIGURE 3 is a transverse section along line 3—3 of FIGURE 2;

FIGURE 4 is a partial section along line 4—4 of FIGURE 3 showing the clutch operating lever;

Figure 5:
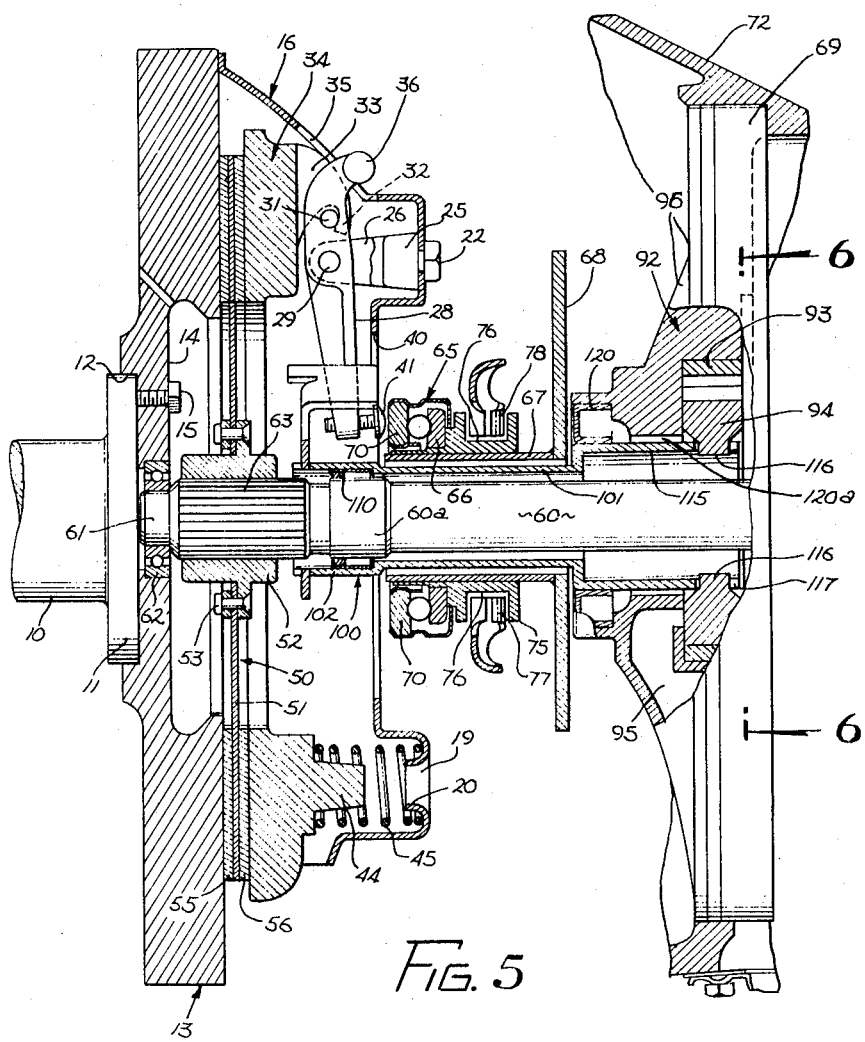
FIGURE 5 is a vertical section along line 5—5 of FIGURE 2 showing the engaged condition of the clutch.
Figure 6:
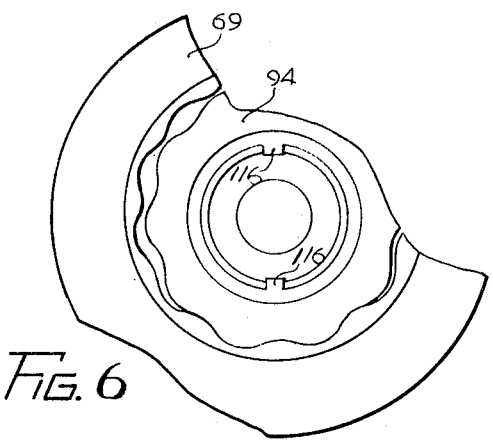
FIGURE 6 is a vertical section along line 6—6 of FIGURE 5 showing the connection of the pump to its drive sleeve.
Figures 7, 8:
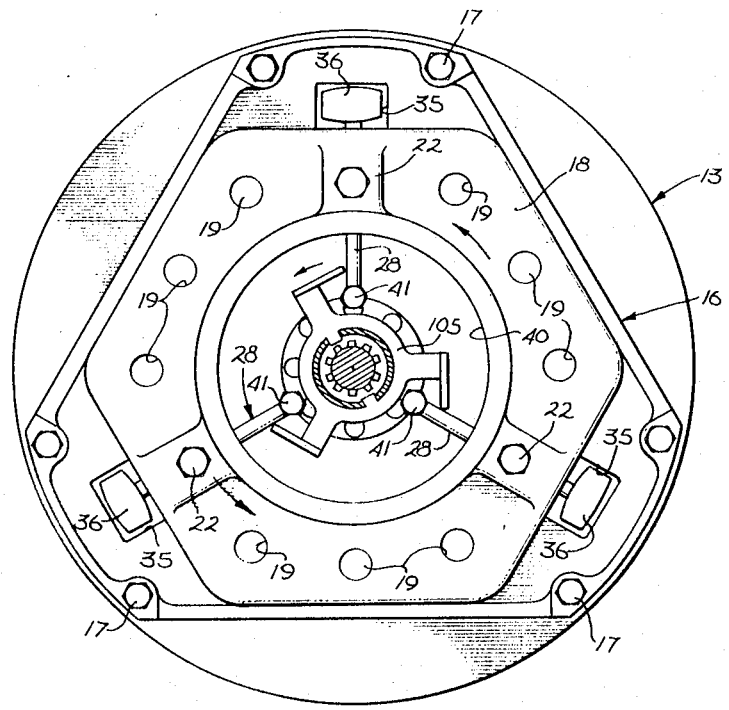
FIGURE 7 is a vertical section along line 7—7 of FIGURE 1 illustrating the clutch actuating arms driving the pump drive sleeve.
FIGURE 8 is an enlarged perspective view of the pump drive sleeve.

Referring to the embodiment of the invention chosen for purposes of illustration only, the engine (not shown) has a crankshaft 10 having a flange 11 on the end which is received by a cavity 12 on one side of flywheel 13. The opposite side of the flywheel contains a cavity 14 so that bolts 15 can be inserted through the flywheel into flange 11 without the head of the bolts interfering with the clutch. A clutch cover plate 16 is secured to the face of the flywheel 13 by means of six bolts 17 (see FIGURE 7) and the outer surface 18 of the cover plate contains a plurality of openings 19 having lips 20 (see FIGURE 1).

Three bolts 22 are spaced equally around the top surface 18 and each bolt is threaded into a bracket 25 which has an end 26 slit for receiving an intermediate portion of an arm 28. Each of the three arms is pivotally mounted on a slit end 26 by a pin 29 for pivotal movement. A second pin 31 is carried by each arm 28 and is displaced outwardly from pin 29 to be received in a hook portion 32 of a projection 33 attached to a pressure plate 34 which is generally in the form of an annular ring. The outer end of each arm 28 projects through an opening 35 in the cover plate 16 and carries a weight 36. The cover plate 16 contains a central opening 40 and the inner end of each arm 28 carries a pin 41 which is accessible through the opening 40 for movement of the arm 28 in a manner later to be described. Pressure plate 34 carries nine projections 44 with one projection located opposite each opening 19. A spring 45 is located between each projection 44 and each lip 20 and has one end located around a projection and the other end located around a lip. The nine springs 45 produce a force on the pressure plate 34 in the direction of the flywheel 13.

A clutch friction disc 50 is located between pressure plate 34 and the flywheel 13 and consists of central flat disc 51 connected to a central splined hub 52 by means of a plurality of fasteners 53. Friction clutch plates 55 and 56 in the form of segments, are attached around the outer perpihery of the disc 51 on opposite sides so that clutch plate 55 faces the fly wheel 13 and clutch plate 56 faces the pressure plate 34. A transmission drive shaft 60 is supported at end 61 in a ballbearing 62 located in the flywheel 13 opposite the flange 11 and the end 61 has a splined section 63 meshing with the splined hub 52 of the clutch friction disc 50. The other end connects to a standard autmatic transmission 63 (such as Chrysler Tork-Flite) in a standard manner( not shown).

It is therefore apparent that springs 45 will normally force the pressure plate 34 against the clutch plate 56 and the clutch plate 55 against the flywheel 13 so that the flywheel 13 will rotate the clutch friction disc 50 and drive the transmission shaft 60 through the spline connection. In this driving condition, the clutch arms 28 extend substantially radially inwardly and the pivot pins 29 and 31 are in substantial radial alignment with each other. At high speeds, the weight 36 will want to move outwardly and thereby produce an additional force on the pressure plate 34 through the hook projections 33 to add to the clutch engaging force produced by the spring 45.

A force on the pins 41 of the arm 28 in a direction towards the flywheel will cause the arms 28 to move the pressure plate 34 away from the flywheel against the force of springs 45 in order to release the clutch and disconnect the flywheel from the transmission drive shaft 60. This force is produced by an axial thrust bearing 65 which has a race 66 carried by a member 75 slidably mounted on a stationary sleeve 67 connected at one end to a mounting plate 68. The outer race 70 of the bearing 65 is opposite each of the pins 41 on the arms 28 for engagement therewith. The mounting plate 68 is attached to the transmission casing 72 by means of three bolts 71 and is spaced by spacer 71' from outer portion of pump housing 69 through which the bolts 71 pass. Since the pump housing 69 is attached to the transmission casing 72, the plate 68 is also rigid with the casing.

The member 75 has a groove 76 which receives projections 77 and 78 on end 79 of a clutch actuating lever 80. The other end 81 of the lever extends through an opening 82 in the casing 72 so that the lever can be operated externally of the casing. The lever has a depression 82a which receives the head 83 of a bolt 84 which is secured to the mounting plate 68 by nut 85. The head 83 is held in the depression by a spring 86 having arms 87 at one end engaging the back of the head 83. The other end 88 of the spring 86 is secured to the lever 80 by means of the bolt 89. Therefore, the spring 86 holds the lever 80 against the bolt head 83 to provide a pivot so that movement of the arm will cause movement of the member 75 on the sleeve 67 in order to move the bearing 65 against the pins 41 to release the clutch (see FIGURE 1). Thus, a force on the lever 80 will relieve the force of the pressure plate 34 on the clutch plates and will release the clutch so that the transmission drive shaft 60 will not rotate with the engine crankshaft 10. However, when the force on the actuating lever is removed, the springs 45 will cause the pressure plate 34 to engage the clutch and drive the transmission shaft by the crankshaft 10. With the clutch released, the transmission can be in gear while the crankshaft is rotating at high speed and the transmission can be instantaneously connected to the engine crankshaft by the removal of force on the clutch lever 80.

The pump 92 is in housing 69 mounted on the transmission casing 72 and consists of a driven rotor 93 and a drive rotor 94. The housing 69 has fluid inlet 95 connected with the fluid source for the transmission and the output of the pump is through one of the many passages (not shown) in the housing 69. A plurality of webs 96 extend from the housing 69 for support.

As previously noted, when a standard torque converter is utilized to drive the transmission 63, the pump is continually driven by the casing of the torque converter which is connected to the engine crankshaft because it is necessary to have fluid pressure to shift the transmission whether or not the torque converter is driving the transmission. The continuous drive of the pump rotor 94 is accomplished in the present invention by the pump drive sleeve 100 which is shown in enlarged perspective in FIGURE 8. The sleeve has a reduced diameter central portion 101 which is located within and spaced from the stationary sleeve 67. Also, the sleeve 100 has a slightly enlarged end 102 which projects through opening 40 in the clutch cover plate 16 and has a pair of end slots 103. These slots receive inward projections 104 on the interior of a ring 105 so as to produce a driving connection between the ring 105 and the end 102. The interior of the drive sleeve end 102 contain needle bearings 109 and seal 110 which rotatably support and seal the sleeve 100 upon an enlargement 60a of the transmission drive shaft 60.

Each of three arms 106 project outwardly from ring 105 and is then bent in the axial direction to provide a drive element 107 having a driving edge 108. Each driving edge 108 is engaged by one of the arms 28 regardless of whether or not the arms are in the clutch engaging or releasing position. In other words, the arms 28 can move relative to the edges 108 and still rotate the pump drive sleeve 100. It is apparent that rotation of the clutch cover plate 16 by the engine crankshaft 10 will also rotate the arms 28 through the pins 29 and will cause the drive sleeve 100 to rotate on the bearings 109.

The opposite end 115 of the drive sleeve 100 is enlarged in diameter and passes through the stationary portion of the pump and into the center opening of the pump rotor 94. The pump rotor has two inward projections 116 which are received in notches 117 in the sleeve end 115 so that rotation of the drive sleeve 100 rotates the pump rotor 94. Since there is a clearance between sleeve end 115 and the housing 69, a bushing 120a and seal 120 are located therebetween to prevent fluid leakage and also to support the end 115. Thus, there is a continuous driving connection between engine crankshaft 10 and the pump rotor 94 through the clutch arms 28 and the drive sleeve 100, and the pump rotor 94 is continually driven by the engine crankshaft regardless of whether the clutch is engaged or released. Therefore, fluid pressure is continually available for shifting the transmission 63 and the transmission can be placed in gear prior to engagement of the friction clutch.

When the clutch is used in drag racing, the vehicle can be placed at the starting line and the engine speeded up while the clutch is released by an external force on lever 80. This force causes the bearing 65 to engage the pins 41 and place a force on the arms 28 which overcomes the force of springs 45 and removes the pressure of pressure plate 34 against the clutch disc 50. During this time, the pump rotor 94 is continually driven through the drive sleeve 100 as has been described so that the transmission can be shifted. When the starting signal is received, the force on lever 80 is removed so that the clutch is engaged by the force of spring 45 to connect the engine crankshaft to the transmission drive shaft.

While the drive sleeve 100 is driven by the arms 28 of the clutch, it is understood that other types of connections can be made between the pump and a continually rotating member, such as the clutch cover plate or flywheel which is attached to the crankshaft. Also, other types of clutch releasing mechanisms can be utilized which permits the clutch to be released and engaged while the engine is running at high speeds. Various other modifications are contemplated by those skilled in the art without departing from the spirit and scope of the invention as hereinafter defined by the appended claims.

What is claimed is:

1. A drive for an oil pump of an automatic transmission coupled by a clutch to an engine comprising:

a sleeve extending between the crankshaft of said engine and said transmission;

first connecting means on one end of said sleeve for continually rotating said sleeve with the crankshaft of said engine;

second connecting means on the other end of said sleeve for continually rotating said oil pump;

means for rotatably supporting said sleeve; and means independent of said pump for controlling the drive condition of said clutch.

2. The combination as defined in claim 1 wherein said first connecting means comprises a clutch cover plate connected with said crankshaft, clutch actuating arms pivoted on said cover plate, said actuating arms extending into contact with said one end of said sleeve in all operating positions of said arms.

3. The combination as defined in claim 2 wherein said one end of said sleeve comprises drive elements spaced outwardly from said sleeve, and a driving edge on each element in continual contact with one of said actuating arms to be driven thereby.

4. The combination as defined in claim 1 wherein said second connecting means comprises an enlarged portion on said other end of said sleeve received by an opening in the rotor of said pump, and means on said enlarged portion for connecting to said rotor.

5. The combination as defined in claim 1 wherein said clutch control means comprises a movable clutch operating member independent of said pump and a mechanical linkage external of said clutch for moving said member.

6. The combination as defined in claim 5 having a stationary tube surrounding said sleeve for slidably supporting said operating member.

7. The combination of claim 6 wherein said first connecting means comprises a clutch cover plate connected with said crankshaft, clutch arms movably mounted on said cover plate for movement to control the operation of said clutch, said operating member being located adjacent the ends of said arms to move said arms and quickly change the drive condition of said clutch upon movement of said member.

References Cited

UNITED STATES PATENTS 2,328,090  8/1943  Nutt et al.
2,381,786  8/1945  Tyler _____ 192—35

ROBERT M. WALKER, Primary Examiner

U.S. Cl. X.R.

103—205